United States Patent
Matsuo

(10) Patent No.: US 11,820,114 B2
(45) Date of Patent: Nov. 21, 2023

(54) METHOD FOR PRODUCING POROUS SILICONE SHEET, FROZEN BODY, AND POROUS SILICONE SHEET ROLLED-BODY

(71) Applicant: NITTO DENKO CORPORATION, Osaka (JP)

(72) Inventor: Naoyuki Matsuo, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 295 days.

(21) Appl. No.: 17/225,196

(22) Filed: Apr. 8, 2021

(65) Prior Publication Data
US 2021/0221111 A1 Jul. 22, 2021

Related U.S. Application Data

(62) Division of application No. 15/564,532, filed as application No. PCT/JP2016/061835 on Apr. 12, 2016, now abandoned.

(30) Foreign Application Priority Data

Apr. 17, 2015 (JP) ................... 2015-085400

(51) Int. Cl.
*B32B 27/28* (2006.01)
*C08J 5/18* (2006.01)
(Continued)

(52) U.S. Cl.
CPC ............ *B32B 27/283* (2013.01); *B29D 7/01* (2013.01); *C08G 77/06* (2013.01); *C08G 77/14* (2013.01);
(Continued)

(58) Field of Classification Search
CPC ........ B32B 27/283; B29D 7/01; C08G 77/06; C08G 77/14; C08J 5/18; C08J 9/286;
(Continued)

(56) References Cited

U.S. PATENT DOCUMENTS

| 5,362,761 | A | 11/1994 | Uragami et al. |
| 7,771,609 | B2 * | 8/2010 | Leventis ............... C01B 33/145 501/12 |

(Continued)

FOREIGN PATENT DOCUMENTS

| CN | 101497444 | 8/2009 |
| JP | H06-219726 | 8/1994 |

(Continued)

OTHER PUBLICATIONS

Chinese Office Action issued with respect to Chinese Application No. 201680022316.8, dated Nov. 4, 2020, with English translation.
(Continued)

*Primary Examiner* — Michael M Dollinger
*Assistant Examiner* — Christina H. W. Rosebach
(74) *Attorney, Agent, or Firm* — Greenblum & Bernstein, P.L.C.

(57) ABSTRACT

The present invention provides a method for producing a porous silicone sheet comprising a freezing step of freezing a wet gel of a porous silicone body having communicating pores and a three-dimensional network silicone skeleton which forms the pores and which is formed by a copolymerization of a bifunctional alkoxysilane and a trifunctional alkoxysilane, to obtain a frozen body, a sheet forming step of forming the frozen body into a sheet to obtain a porous silicone sheet, and a cleaning step of cleaning the porous silicone sheet. According to the method of the present invention, a porous silicone body from which impurities have been sufficiently removed can be produced. In the course of the production, occurrence of fracture of a wet gel can be effectively prevented.

4 Claims, 1 Drawing Sheet

(51) Int. Cl.
  *C08G 77/06* (2006.01)
  *C08G 77/14* (2006.01)
  *C08J 9/36* (2006.01)
  *C08J 9/28* (2006.01)
  *B29D 7/01* (2006.01)

(52) U.S. Cl.
  CPC .............. *C08J 5/18* (2013.01); *C08J 9/286* (2013.01); *C08J 9/36* (2013.01); *C08J 2201/0504* (2013.01); *C08J 2201/0546* (2013.01); *C08J 2205/028* (2013.01); *C08J 2205/05* (2013.01); *C08J 2383/04* (2013.01)

(58) Field of Classification Search
  CPC ......... C08J 9/36; C08J 9/24; C08J 9/26; C08J 2201/0504; C08J 2201/546; C08J 2205/028; C08J 2205/05; C08J 2383/04
  See application file for complete search history.

(56) References Cited

U.S. PATENT DOCUMENTS

| | | | |
|---|---|---|---|
| 2005/0115216 A1 | 6/2005 | Bauer | |
| 2014/0076070 A1* | 3/2014 | Nakanishi | B01J 20/28085 521/154 |
| 2017/0210108 A1* | 7/2017 | Mihalcik | B32B 5/02 |
| 2018/0072031 A1 | 3/2018 | Matsuo | |
| 2019/0062517 A1* | 2/2019 | Steiner, III | C08J 9/28 |

FOREIGN PATENT DOCUMENTS

| | | |
|---|---|---|
| JP | H06-287348 | 10/1994 |
| JP | H08-300567 | 11/1996 |
| JP | 2893104 | 3/1999 |
| JP | 3397255 | 2/2003 |
| JP | 2005-350519 | 12/2005 |
| JP | 2006-241275 | 9/2006 |
| JP | 2010-120780 | 6/2010 |
| JP | 2012-062341 | 3/2012 |
| JP | 2014-061457 | 4/2014 |
| WO | 2005/068537 | 7/2005 |

OTHER PUBLICATIONS

Second Office Action in Chinese Application No. 201680022316.8 dated Jul. 30, 2020 with English translation.
Office Action in Chinese Application No. 201680022316.8 dated Dec. 2, 2019 with English translation.
International Search Report from Patent Application No. PCT/JP2016/061835, dated Jul. 12, 2016.
International Preliminary Report on Patentability from Patent Application No. PCT/JP2016/061835, dated Oct. 17, 2017.
Extended European Search Report for EP 16 78 0048.1, dated Nov. 6, 2018.
Office Action issued in TW 105111935, dated Nov. 19, 2018, with English translation.
Machine translation of JP2008258073 by Matsushima et al. (Year:2008).
Hayase, G, Kanamori, K., Fukuchi, M., Kaji, H, and Nakanishi, K. (2013), Facile Synthesis of Marshmallow-like Macroporous Gels Usable under Harsh Conditions for the Separation of Oil and Water. Agnew. Chem. Int. Ed., 52: 1986-1989, https://doi.org/10.1002/anie.201207969 (Year: 2013).
Korean Office Action issued with respect to Korean Application 10-2017-7029427, dated Feb. 25, 2022, with English translation.
Korean Office Action issued with respect to Korean Application 10-2017-7029427, dated Aug. 22, 2022, with English translation.

* cited by examiner

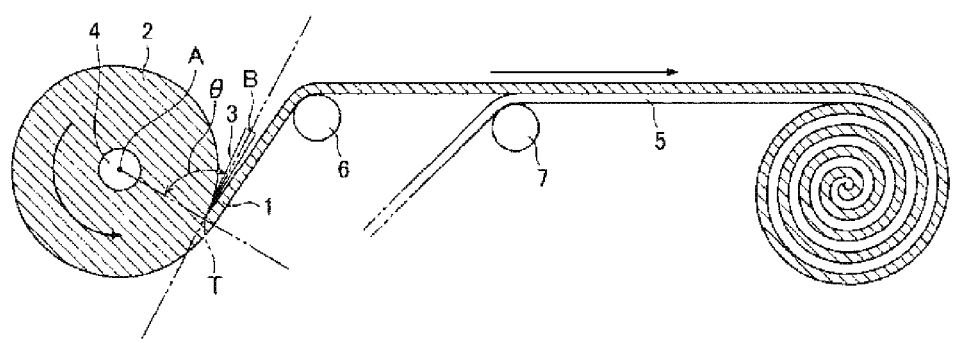

METHOD FOR PRODUCING POROUS SILICONE SHEET, FROZEN BODY, AND POROUS SILICONE SHEET ROLLED-BODY

The present application is a Divisional of U.S. application Ser. No. 15/564,532, which is a U.S. National stage of International Patent Application No. PCT/JP2016/061835, filed Apr. 12, 2016, which claims priority to Japanese Application No. 2015-085400, filed Apr. 17, 2015. The disclosures of each of the applications listed above are incorporated by reference herein in their entireties.

TECHNICAL FIELD

The present invention relates to a method for producing a porous silicone sheet, frozen body, and a porous silicone sheet rolled-body.

BACKGROUND ART

A sol-gel reaction involving phase separation has conventionally been known as a method for obtaining a monolithic porous material having continuous though-holes with controlled sizes in an organic-inorganic hybrid system using an oxide such as silica or titania, and a trifunctional alkoxysilane as starting materials (see Patent Documents 1 and 2). However, in those porous bodies, elastic modulus of a gel is extremely low, and brittleness is high as a whole. Therefore, it was difficult to impart flexibility withstanding large deformation to the porous bodies.

In view of the conventional problems, studies on a monolithic porous material further having high flexibility are proceeding. Patent Document 3 describes the preparation of a silicone monolithic body of an aerogel or xerogel having continuously penetrating flow channels and a silicone skeleton capable of dissolving chemical species by using both a bifunctional group-containing alkoxysilane and a trifunctional group-containing alkoxysilane or trifunctional or higher group-containing alkoxysilane as staring materials, copolymerizing those silanes by a sol-gel reaction, forming a network by Si—O bonds and simultaneously performing phase separation. Patent Document 3 further describes that the silicone monolithic body has both high flexibility and high porosity.

PRIOR ART DOCUMENTS

Patent Document

Patent Document 1: Japanese Patent No. 2893104
Patent Document 2: Japanese Patent No. 3397255
Patent Document 3: JP-A-2014-61457

SUMMARY OF THE INVENTION

Problems that the Invention is to Solve

As a result of investigations on the silicone monolithic body (hereinafter referred to as a porous silicone body) described in Patent Document 3, the present inventors have obtained the following finding. In Patent Document 3, impurities such as unreacted precursors, a catalyst and a surfactant are removed by applying cleaning to a bulk wet gel (swollen gel) prepared in a closed vessel. However, as a result of further investigations by the present inventors, it became clear that even though cleaning is applied to a bulk wet gel, particularly a large-sized bulk wet gel, impurities remained inside pores of the bulk cannot be sufficiently removed, and there are problems of ununiformity of density distribution after drying and inhibition of water repellent function of a skeleton itself. Furthermore, the problem became clear that when a bulk wet gel, particularly a large-sized bulk wet gel, is taken out of the closed vessel, the wet gel may fracture by its weight.

Accordingly, the present invention has an object to produce a porous silicone body from which impurities have been sufficiently removed. Furthermore, the present invention has an object to effectively prevent occurrence of fracture of the wet gel in the production process.

Means for Solving the Problems

As a result of further extensive and intensive investigations in view of the above problems, the present inventors have found that the above problems can be solved by forming a frozen body obtained by freezing a wet gel into a sheet, and have reached to complete the present invention.

Specifically, the present invention provides a method for producing a porous silicone sheet comprising a freezing step of freezing a wet gel of a porous silicone body having communicating pores and a three-dimensional network silicone skeleton which forms the pores and which is formed by a copolymerization of a bifunctional alkoxysilane and a trifunctional alkoxysilane, to obtain a frozen body, a sheet forming step of forming the frozen body into a sheet to obtain a porous silicone sheet, and a cleaning step of cleaning the porous silicone sheet.

In the method for producing a porous silicone sheet, the sheet forming step may comprise subjecting the frozen body to a skiving processing.

The method for producing a porous silicone sheet may further comprise a rolling step of rolling the porous silicone sheet.

The present invention further provides a frozen body obtained by freezing a wet gel of a porous silicone body having communicating pores and a three-dimensional network silicone skeleton which forms the pores and which is formed by a copolymerization of a bifunctional alkoxysilane and a trifunctional alkoxysilane.

The present invention further provides a porous silicone sheet rolled-body having communicating pores and a three-dimensional network silicone skeleton which forms the pores and which is formed by a copolymerization of a bifunctional alkoxysilane and a trifunctional alkoxysilane.

Advantageous Effects of the Invention

According to the production method of the present invention, a frozen body obtained by freezing a wet gel is formed into a sheet to obtain a porous silicone sheet. The porous silicone sheet is thinned. Therefore, impurities in the sheet can be satisfactorily removed by cleaning. Furthermore, the wet gel is frozen. Therefore, fracture by its weight of the wet gel is effectively prevented. Furthermore, the frozen body of the frozen wet gel maintains it shape. Therefore, fracture in forming into a sheet is effectively prevented. Furthermore, the porous silicone sheet formed into a sheet is thinned. Therefore, fracture by its weight is effectively prevented even after the frozen state has been dissolved.

BRIEF DESCRIPTION OF THE DRAWING

FIG. 1 is a schematic view showing the state when a frozen body of a wet gel is subjected to skiving processing.

MODE FOR CARRYING OUT THE INVENTION

An embodiment of the present invention is described in detail below.

An embodiment of a method for producing a porous silicone sheet of the present invention is described below.

The method for producing a porous silicone sheet of the present embodiment comprises a freezing step of freezing a wet gel of a porous silicone body having communicating pores and a three-dimensional network silicone skeleton which forms the pores and which is formed by a copolymerization of a bifunctional alkoxysilane and a trifunctional alkoxysilane, to obtain a frozen body, a sheet forming step of forming the frozen body into a sheet to obtain a porous silicone sheet, and a cleaning step of cleaning the porous silicone sheet.

(Preparation Step)

In the method for producing a porous silicone sheet of the present embodiment, as a preparation step, a bifunctional alkoxysilane and a trifunctional alkoxysilane are copolymerized with each other by a sol-gel reaction involving phase separation to obtain a wet gel.

More specifically, in this step, a bifunctional alkoxysilane and a trifunctional alkoxysilane are used as precursors, those are networked through Si—O bond by copolymerization by a sol-gel reaction, and simultaneously an acid-base two stage reaction is conducted by an acid catalyst and a base catalyst while controlling phase separation with a surfactant. Thus, a wet gel of a porous silicone body having communicating pores and a three-dimensional network silicone skeleton that forms the pores is formed.

The porous silicone body has communicating pores and a three-dimensional network silicone skeleton that forms the pores. Specifically, the porous silicone body in the present embodiment has a monolithic structure. The "monolithic structure" used herein is a bicontinuous structure integrally constituted of a continuous three-dimensional network skeleton and communicating pores.

The surface of the three-dimensional network silicone skeleton of the porous silicone body comprises the part forming (demarcating) an external form of the porous silicone body itself and the part forming (demarcating) the communicating pores. The "wet gel" in the present description indicates a state that a liquid such as a reaction liquid after a sol-gel reaction has been adhered to the whole or a part of the surface of the three-dimensional network silicone skeleton of the porous silicone body.

In this step, a solvent, an acid catalyst, a base catalyst and a surfactant are mixed with each other in an appropriate vessel such as a vessel made of a metal such as stainless steel or a glass vessel. Examples of the solvent that can be used include water, ethanol and methanol. Examples of the acid catalyst that can be used include acetic acid, oxalic acid and formic acid. Examples of the base catalyst that can be used include urea and ammonia water. Examples of the surfactant that can be used include n-hexadecyltrimethyl ammonium chloride (CTAC) and cetyltrimethylammonium bromide (CTAB).

In one specific embodiment, for example, acetic acid as an acid catalyst is mixed with water as a solvent in a vessel such as a glass vessel to prepare an acetic acid aqueous solution, and n-hexadecyltrimethylammonium chloride (CTAC) as a surfactant and urea as a base catalyst are added thereto.

A bifunctional alkoxysilane and a trifunctional alkoxysilane as precursors are then added to the resulting mixture, followed by stirring, for example, at from 10 to 30° C. for from 0.5 to 2.0 hours, thereby hydrolysis of the precursors proceeds.

Thereafter, the solution obtained is placed in a closed state, and heated, for example, at from 50 to 85° C. for from 6 to 48 hours. The base catalyst is hydrolyzed to form basic conditions, and the hydrolyzed precursors are polycondensed by a sol-gel reaction to obtain a wet gel (wet gel). In placing the solution in a closed state, for example, the vessel containing the solution may be placed in the closed state, or the solution may be transferred to a closed vessel other than the vessel.

The bifunctional alkoxysilane has four bonding groups bonded to silicon. Of the four bonding groups, two groups are alkoxy groups that participate in polymerization (bonding), and the remaining two groups are modifying groups that do not participate in a reaction. The bifunctional alkoxysilane is represented by the following chemical formula (1).

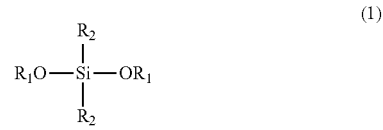

The alkoxy group (—OR$_1$) in the bifunctional alkoxysilane is preferably an alkoxy group having 1 to 5 carbon atoms. From the standpoint of hydrolysis reaction rate, the alkoxy group is preferably methoxy group, ethoxy group or propoxy group, and more preferably methoxy group or ethoxy group. Two alkoxy groups (—OR$_1$) in the bifunctional alkoxysilane may be the same or different.

Examples of the modifying group (—R$_2$) in the bifunctional alkoxysilane include a substituted or unsubstituted alkyl group, an aryl group, a vinyl group and a mercaptoalkyl group.

The alkyl group in the substituted or unsubstituted alkyl group is preferably an alkyl group having 1 to 5 carbon atoms. Methyl group or ethyl group is preferred, and methyl group is more preferred. Example of the substituent includes a halogen element such as fluorine, chlorine, bromine or iodine. The substituted alkyl group is preferably a fluoroalkyl group.

Examples of the aryl group include phenyl group, tolyl group, xylyl group, biphenylyl group and naphthyl group. Phenyl group is preferred.

Examples of the mercaptoalkyl group include mercaptomethyl group, mercaptoethyl group and mercaptopropyl group. Mercaptopropyl group is preferred.

Two modifying groups (—R$_2$) in the bifunctional alkoxysilane may be the same or different. From the standpoint of imparting functions such as water repellency and heat resistance to the structure to be obtained, at least one of those two modifying groups is preferably selected from the group consisting of methyl group, phenyl group and a fluoroalkyl group.

Examples of the bifunctional alkoxysilane specifically include dimethyl dimethoxysilane, methylphenyl dimethoxysilane, methylvinyl dimethoxysilane, 3-mercaptopropylmethyl dimethoxysilane and 3,3,3-trifluoropropylmethyl dimethoxysilane. From the standpoint of improvement of heat resistance, dimethyl dimethoxysilane and methylphenyl dimethoxysilane are particularly preferred. The bifunctional alkoxysilane may be used in one kind alone or as mixtures of two or more kinds.

The trifunctional alkoxysilane has four bonding groups bonded to silicon. Of the four bonding groups, three groups are alkoxy groups that participate in polymerization (bonding), and the remaining one group is a modifying group that does not participate in a reaction. The trifunctional alkoxysilane is represented by the following chemical formula (2).

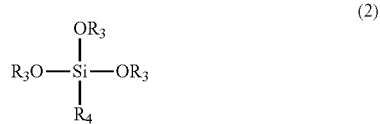

Examples of the alkoxy group (—OR$_3$) in the trifunctional alkoxysilane include the same groups as in the alkoxy group (—OR$_1$) in the bifunctional alkoxysilane. Examples of the modifying group (—R$_4$) in the trifunctional alkoxysilane include the same groups as in the modifying group (—R$_2$) in the bifunctional alkoxysilane.

The modifying group in the trifunctional alkoxysilane is preferably methyl group, phenyl group or a fluoroalkyl group, from the standpoint of imparting functions such as water repellency and heat resistance to the structure to be obtained.

Examples of the trifunctional alkoxysilane specifically include methyl trimethoxysilane, vinyl trimethoxysilane and 3-mercaptopropyl trimethoxysilane. Methyl trimethoxysilane is particularly preferred from the standpoint of the improvement of heat resistance. The trifunctional alkoxysilane may be used in one kind alone or as mixtures of two or more kinds.

In the present invention, tri- or more polyfunctional alkoxysilanes may be further copolymerized together with the bifunctional alkoxysilane and trifunctional alkoxysilane. The tri- or more polyfunctional alkoxysilanes used herein mean silanes having more than three alkoxy groups participating in polymerization (bonding). Examples of the tri- or more polyfunctional alkoxysilanes include alkoxysilanes having —Si—C—C—Si— structure or —Si-phenyl-Si— structure. The number of bonding groups to Si is 4. However, by using the alkoxysilanes having —Si—C—C—Si— structure or —Si-phenyl-Si— structure as a crosslinking agent, 6 functional groups can be utilized, and denser silicone network can be formed.

Example of the alkoxysilane having —Si—C—C—Si— structure includes 1,2-bis(methyldiethoxysilyl)ethane.

Polymerization ratio between the bifunctional alkoxysilane and the trifunctional alkoxysilane can be appropriately selected considering properties and the like of a desired porous silicone body, and is not particularly limited. The polymerization ratio (bifunctional alkoxysilane:trifunctional alkoxysilane) is preferably 2:8 to 6:4, and more preferably 3:7 to 5:5, in volume ratio. When the polymerization ratio is 2:8 or more, it is preferred in imparting flexibility to a porous body to be obtained. Furthermore, when the polymerization ratio is 6:4 or less, it is preferred in maintaining mechanical strength.

When the tri- or more polyfunctional alkoxysilanes are further copolymerized together with the bifunctional alkoxysilane and trifunctional alkoxysilane, the polymerization ratio of the tri- or more polyfunctional alkoxysilanes is not particularly limited. However, volume ratio to the total of the bifunctional alkoxysilane and trifunctional alkoxysilane (total of bifunctional alkoxysilane and trifunctional alkoxysilane:tri- or more polyfunctional alkoxysilanes) is, for example, 6:4 to 4:6.

(Freezing Step)

Subsequently, a freezing step of freezing the wet gel obtained by the preparation step to obtain a frozen body is carried out. When the wet gel is frozen to form a frozen body, its shape is maintained, and as a result, the occurrence of fracture by a weight itself can be prevented.

The freezing method in freezing the wet gel is not particularly limited so long as it can freeze the wet gel. For example, a method of maintaining a vessel containing the wet gel under the environment that the wet gel freezes (for example, in the case of using water as a solvent, 0° C. or lower) is exemplified.

The freezing temperature in freezing the wet gel is not particularly limited so long as it is a temperature that can freeze the frozen gel, and can be appropriately selected depending on the kind of a solvent, and the like. For example, in the case of using water as a solvent, the freezing temperature is set to 0° C. or lower (for example, from −50 to 0° C., and preferably from −30 to 0° C.). Furthermore, the freezing temperature can be appropriately adjusted by adjusting a pressure in the freezing step. The pressure in the freezing step is not particularly limited, and is, for example, from 0.1 to 2.0 atm.

(Sheet Forming Step)

Next, a sheet forming step of forming the wet gel obtained in the freezing step into a sheet to obtain a porous silicone sheet is carried out. According to the sheet forming step, the frozen body of the wet gel frozen by the freezing step maintains its shape. Therefore, fracture of the frozen body can be effectively prevented in forming into a sheet.

The ambient temperature in forming the frozen body into a sheet is appropriately selected depending on the kind of a solvent used in the preparation step, and the like, and is not particularly limited. It is preferred to maintain the ambient temperature to an extent such that the frozen body does not thaw. As an example, the ambient temperature in forming the frozen body into a sheet in the case of using water as a solvent is, for example, from −50 to 0° C., and preferably from −30 to 0° C.

In this step, the frozen gel in forming into sheet is required to be in the state of a frozen boy (frozen state). Therefore, the porous silicone sheet after forming into a sheet may be a frozen state and may not be a frozen state. In other words, the porous silicone sheet is thinned after forming into a sheet. Therefore, even after the frozen state has been dissolved, fracture by its weight can be effectively prevented.

The porous silicone sheet obtained by this step has a thickness of, for example, from 0.05 to 30 mm, and preferably from 0.5 to 15 mm. In case where the thickness of the porous silicone sheet exceeds 30 mm, there is a case where impurities such as unreacted precursors, a catalyst and a surfactant cannot be satisfactorily removed even by a cleaning step described hereinafter. On the other hand, in case where the thickness of the porous silicone sheet is less than 0.05 mm, there is a case where the sheet fractures in cleaning and sheet conveying steps described hereinafter.

The method for forming the frozen body into a sheet is not particularly limited, and examples of the method include a method of slicing the frozen body with various cutting tools such as a cutter or a knife, or appropriate means such as a laser or water jet, and a method of applying skiving processing to the frozen body. Above all, skiving processing is preferred from the standpoint of the possibility of continuous sheet formation.

An embodiment in the case of applying skiving processing to a frozen body of a wet gel is described below by reference to the drawing. The skiving processing in the present embodiment means a so-called rotary cutting (rotary stripping).

FIG. 1 is a schematic view showing the state when the state in subjecting a frozen body of a wet gel to skiving process has been seen from a direction of rotation axis of a mandrel 4.

As shown in FIG. 1, the mandrel 4 (also called a core or a shaft) is inserted in an axis position of a frozen body 2 formed in a cylindrical shape. The mandrel 4 may be inserted in the frozen body 2 after freezing a wet gel to prepare the frozen body 2, or may be previously inserted in a wet gel before freezing. Alternatively, the mandrel 4 may be previously set to a reaction vessel in the stage before preparing a wet gel.

Thus, when skiving processing is applied to a frozen body by pressing a cutting blade 3 to the surface of the frozen body 2 while rotating the frozen body 2 in one direction as the mandrel 4 inserted in the axis position being a rotation axis, the frozen body 2 is formed into a sheet to form a porous silicone sheet 1.

In the case of seeing the frozen body 2 from a direction of a rotation axis as in FIG. 1, an angle θ of ∠ATB formed by a rotation center A of the frozen body 2, a contact position T between the cutting blade 3 and the frozen body 2, and a point B on a blade face of the cutting blade 3 is generally from 20 to 120°, preferably from 70 to 110°, and more preferably from 80 to 110°. When the angle θ is within this range, skiving processing can be satisfactorily carried out. The blade face on the cutting blade 3 means a face including a tip position of a blade (the contact position T to the frozen body 2) in FIG. 2, and further including a bisector of an angle in a cross-section of the tip part of a blade.

Higher line speed of the porous silicone sheet 1 in performing skiving processing is preferred from the standpoint of productivity. However, excessively high line speed may lead to deterioration of thickness accuracy. Therefore, the line speed is preferably from 0.1 to 30 m/min. and more preferably from 1 to 10 m/min.

Cutting thickness of the porous silicone sheet 1 is, for example, from 0.05 to 30 mm, preferably from 0.5 to 15 mm, and more preferably from 1 to 10 mm.

The long porous silicone sheet 1 continuously formed into a sheet by skiving processing may be directly conveyed using a conveying roller 6 as necessary. However, since the porous silicone sheet 1 is thinned, tensile strength is low, and there is a case where it is difficult to convey the sheet in the state that tensile stress has been applied thereto. Therefore, when conveying the long porous silicone 1, it is preferred to convey in the state that the sheet is placed on a long sheet-like carrier substrate (supporting substrate) 5 to be conveyed using a conveying roller 7 as necessary. When the porous silicone sheet 1 is conveyed in the state of placing the sheet on the carrier substrate 5, the porous silicone sheet 1 formed into a sheet by skiving processing can be conveyed without fracture. The carrier substrate 5 may be arranged on only one side of the porous silicone sheet 1 and may be arranged on both sides thereof.

As the carrier substrate 5, a substrate having tensile strength to an extent such that it does not fracture during conveying can be appropriately used. Examples of the carrier substrate that can be used include a mesh comprising a nonwoven fabric, plastic or the like, and various sheets comprising a paper, plastic or the like. When cleaning is carried out in a cleaning step described hereinafter in the state that the porous silicone sheet 1 has been placed on the carrier substrate 5, it is preferred to use a porous substrate through which a cleaning liquid containing impurities can easily pass.

(Cleaning Step)

A cleaning step of cleaning the porous silicone sheet obtained by the sheet forming step is carried out. In the cleaning step, impurities such as unreacted precursors, a catalyst and a surfactant remained in the porous silicone sheet are removed. Since the porous silicone sheet is thinned, impurities in the sheet can be satisfactorily removed by cleaning.

The cleaning method is not particularly limited, and at least one of various cleaning methods warm water cleaning, ultrasonic cleaning, suction by suction roll, microbubble cleaning, shower-spray cleaning, cleaning by vibration using punching metal roll and chrysanthemum type roll together (FV cleaning system, see JP-A 2006-320811), and the like can be appropriately be used.

In each of the above cleaning methods, at least one of various solvents such as water, methanol, ethanol, isopropyl alcohol, dioxane, ether, butyl acetate, acetonitrile, chloroform, acetone, toluene, benzene and dichloromethane can be appropriately used as a cleaning liquid in conducting a cleaning method using a cleaning liquid.

(Drying Step)

After removing impurities by the cleaning method, a drying step of drying the porous silicone sheet is carried out.

For example, the porous silicone sheet after the cleaning step is dipped in a non-polar solvent such as normal hexane to perform solvent substitution, and then dried, for example, at 20 to 80° C. for 5 to 24 hours. Thus, a porous silicone sheet having a monolithic structure as a xerogel is obtained. In conducting the drying step, the sheet may be dried after substituting with the non-polar solvent as described before, but may be dried in the state that a part or the whole of the sheet is dipped in a cleaning liquid, without passing through a substitution step. Furthermore, a porous silicone sheet having a monolithic structure as a xerogel can be obtained by subjecting the porous silicone sheet after the cleaning step to supercritical drying using carbon dioxide gas or the like.

(Rolling Step)

In the method for producing a porous silicone sheet of the present embodiment, in addition to each step described above, a rolling step of rolling the porous silicone sheet may be further carried out, as necessary. By this step, a rolled-body of the porous silicone sheet having communicating pores and a three-dimensional network silicone skeleton which forms the pores and which is formed by a copolymerization of a bifunctional alkoxysilane and a trifunctional alkoxysilane can be produced.

The rolling step is not particularly limited so long as it can form the porous silicone sheet into a roll form. From the standpoint of production efficiency, it is preferred to wind up the sheet in a roll form while conveying a long porous silicone sheet produced by skiving processing. In the case of rolling a long porous silicone sheet 1 produced by skiving processing, the porous silicone sheet 1 may be rolled together with the carrier substrate 5 as shown in FIG. 1, but only the porous silicone sheet 1 may be rolled. Alternatively, a sheet-formed thin porous silicone sheet can be wound up in a roll form.

In the present embodiment, the porosity of the porous silicone sheet (porous silicone body) is not particularly limited, but is preferably 50% or more, more preferably 80% or more, and still more preferably 90% or more. In case where the porosity is less than 50%, flexibility and lightness may be deteriorated. On the other hand, when the porosity is too high, mechanical strength may be deteriorated. Therefore, the porosity is preferably 95% or less.

The average pore size of the communicating pores in the porous silicone sheet (porous silicone body) is not particularly limited, but is, for example, from 50 to 50,000 nm. The skeleton diameter of the silicone skeleton is not particularly limited, but is, for example, from 50 to 10,000 nm. The average pore size of the communicating pores in the porous silicone body can be measured by SEM, optical microscope or the like. Furthermore, the skeleton diameter of the silicone skeleton can be measured by SEM, optical microscope or the like.

The silicone skeleton of the porous silicone sheet obtained by the production method of the present embodiment is a three-dimensional network silicone skeleton formed by the copolymerization of a bifunctional alkoxysilane and a trifunctional alkoxysilane. The porous silicone sheet has a monolithic structure having the three-dimensional network silicone skeleton thus formed and communicating pores, and as a result, has high flexibility and also high heat resistance on the basis of a siloxane bond. Therefore, the porous silicone sheet can be usefully used as a damping material, a vibration-proof material, a cushioning material, a heat insulating material, a sound absorbing material, a permeable member and the like in the fields of aviation, space, automobile, nuclear powder facility, ship and the like.

EXAMPLES

The present invention is further described below by reference to examples, but the invention is not construed as being limited to the following examples.

Example 1 n-Hexadecyltrimethylammonium chloride (10 g) as a surfactant and urea (50 g) were added to 5 mM acetic acid aqueous solution (150 mL), followed by mixing those in a glass vessel under stirring.

Methyl trimethoxysilane (30 mL) and dimethyl dimethoxysilane (20 mL) as precursors were added to the glass vessel, followed by stirring with a stirrer for 60 minutes. After stirring, the resulting solution was transferred to a cylindrical closed vessel, and heated at 80° C. for 24 hours, thereby hydrolyzing urea to form basic conditions. The precursors hydrolyzed were polycondensed by a sol-gel reaction under the basic conditions.

The wet gel (swallen gel) obtained was allowed to stand in a freezer of −10° C. for 5 hours in the state of placing the wet gel in the vessel, and formed into a frozen state. The cylindrical wet gel in a frozen state was taken out of the vessel, a mandrel was driven into the cylindrical wet gel along a center axis thereof, and the cylindrical wet gel was rotated as the mandrel driven being an axis in one direction at a constant peripheral velocity of 0.5 m/min. A cutting blade was pushed on the rotating cylindrical wet gel such that an angle θ of ∠ATB shown in FIG. 1 was 90° to perform skiving processing, and a frozen porous silicone sheet having a thickness of 1 mm and a width of 50 mm was continuously produced. The frozen porous silicone sheet produced was passed through hot water at 60° C. in a distance of 50 m while conveying the sheet at a speed of 0.5 m/min in the state of placing on a polypropylene mesh substrate as a carrier substrate, thereby removing impurities by cleaning, and then dried at 70° C. for 2 hours. Thereafter, the porous silicone sheet was wound up to obtain the porous silicone body formed into a sheet in a roll form (rolled-body of porous silicone sheet). As a result of measuring an apparent specific density of the porous silicone sheet obtained, it was 0.09 g/cc. This apparent specific density was equal to an apparent specific density (0.15 g/cc or less) of a small piece of a normal porous silicone sheet (after appropriately removing impurities) manually prepared without conducting freezing and skiving processing treatments. Therefore, it was confirmed that impurities could be appropriately removed.

Example 2

A porous silicone body formed into a sheet in a roll form (rolled-body of a porous silicone sheet) was obtained under the same conditions as in Example 1, except that cleaning by FV cleaning method (a method in which a chrysanthemum type rotor rotates in punching metal roll to generate water flow in an opening part of the punching metal roll, and an object to be cleaned is brought into contact with the water flow to perform cleaning, number of revolution of chrysanthemum type rotor: 450 rpm, cleaning liquid: water, water temperature: 25° C., path length: 10 m) was conducted as the cleaning step. Similar to Example 1, as a result of measuring an apparent specific density of the porous silicone body prepared, it was a normal numerical value of 0.09 g/cc, and it was confirmed that impurities could be appropriately removed.

Comparative Example 1

The wet gel prepared by the method described in Example 1 was allowed to stand and dried in an oven at 70° C. for 24 hours in the state that the gel was placed in the vessel to obtain a porous silicone body. As a result of measuring an apparent specific gravity of the porous silicone body obtained, it was 0.30 g/cc. This value exceeded a normal numerical value (0.15 g/cc or less) of an apparent specific gravity of a porous silicone body prepared in an appropriate manner, and this fact suggested that impurities remain. Furthermore, as a result of measuring a water contact angle (5 μL), water droplets permeated. It was confirmed from this that impurities derived from a surfactant remain. (In case where impurities were normally removed, water droplets do not permeate, and water repellency of a water contact angle of 140° or more is shown).

Comparative Example 2

The wet gel prepared in the method described in Example 1 was taken out of the vessel under atmospheric pressure without freezing. The wet gel could not maintain its shape due to its weight, and a mandrel could not be inserted therein. As a result, skiving processing could not be performed.

Although the present invention has been described in detail and by reference to the specific embodiments, it is apparent to one skilled in the art that various modifications or changes can be made without departing the spirit and scope of the present invention.

This application is based on Japanese Patent Application No. 2015-085400 filed Apr. 17, 2015, the disclosure of which is incorporated herein by reference in its entity.

DESCRIPTION OF REFERENCE NUMERALS AND SIGNS

1 Porous silicone sheet
2 Frozen body
3 Cutting blade
4 Mandrel
5 Carrier substrate
6 Conveying roller
7 Conveying roller

What is claimed is:

1. A method for producing a porous silicone sheet comprising a freezing step of freezing a wet gel of a porous silicone body having communicating pores and a three-dimensional network silicone skeleton which forms the pores and which is formed by a copolymerization of a bifunctional alkoxysilane and a trifunctional alkoxysilane, to obtain a frozen body, a sheet forming step of forming the frozen body into a sheet to obtain a porous silicone sheet, and a cleaning step of cleaning the porous silicone sheet.

2. The method according to claim 1, wherein the sheet forming step comprises subjecting the frozen body to a skiving processing.

3. The method according to claim 1, further comprising a rolling step of rolling the porous silicone sheet.

4. The method according to claim 2, further comprising a rolling step of rolling the porous silicone sheet.

* * * * *